(12) United States Patent
Bayat et al.

(10) Patent No.: US 11,822,191 B2
(45) Date of Patent: Nov. 21, 2023

(54) DISPLAY SYSTEM WITH LOCALIZED OPTICAL ADJUSTMENTS

(71) Applicant: Apple Inc., Cupertino, CA (US)

(72) Inventors: Khadijeh Bayat, Santa Clara, CA (US); Avery P. Yuen, San Jose, CA (US); Chaohao Wang, Sunnyvale, CA (US); Runyu Zhang, Urbana, IL (US); Xianwei Zhao, Fremont, CA (US); Xiaokai Li, Sunnyvale, CA (US); Yang Li, Sunnyvale, CA (US); Zhibing Ge, Los Altos, CA (US); Alex H. Pai, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 16/849,164

(22) Filed: Apr. 15, 2020

(65) Prior Publication Data

US 2020/0393718 A1 Dec. 17, 2020

Related U.S. Application Data

(60) Provisional application No. 62/860,721, filed on Jun. 12, 2019.

(51) Int. Cl.
*G02F 1/1343* (2006.01)
*G02B 27/01* (2006.01)
*G02F 1/137* (2006.01)
*G02F 1/29* (2006.01)

(52) U.S. Cl.
CPC ..... *G02F 1/13439* (2013.01); *G02B 27/0172* (2013.01); *G02F 1/1343* (2013.01); *G02F 1/13725* (2013.01); *G02F 1/29* (2013.01); *G02B 2027/0118* (2013.01)

(58) Field of Classification Search
CPC ........ G02B 2027/0118; G02B 27/0172; G02F 1/134336; G02F 1/29; G02F 1/1343
See application file for complete search history.

(56) References Cited

U.S. PATENT DOCUMENTS

| | | |
|---|---|---|
| 5,587,820 A | 12/1996 | May et al. |
| 5,846,452 A | 12/1998 | Gibbons et al. |
| 5,969,850 A | 10/1999 | Harrold et al. |
| 7,042,612 B2 | 5/2006 | Lazarev et al. |

(Continued)

*Primary Examiner* — Alexander P Gross
(74) *Attorney, Agent, or Firm* — Treyz Law Group, P.C.; G. Victor Treyz; Tianyi He

(57) ABSTRACT

An electronic device such as a head-mounted device may have a display that displays computer-generated content for a user. The head-mounted device may have an optical system that directs the computer-generated content towards eye boxes for viewing by a user. The optical system may include a spatially addressable adjustable optical component. The adjustable optical component may have first and second electrodes and an electrically adjustable material between the first and second electrodes. The electrically adjustable material may include a transparent conductive material such as indium tin oxide that includes a pattern of segmented trenches configured to provide the transparent conductive material with electrical anisotropy. Contacts may be coupled to the transparent conductive material. Control circuitry can adjust the electrically adjustable material to form a spatially addressable light modulator or adjustable lens.

11 Claims, 9 Drawing Sheets

(56) References Cited

U.S. PATENT DOCUMENTS

| | | |
|---|---|---|
| 8,542,333 B2 | 9/2013 | Galstian |
| 9,065,991 B2 | 6/2015 | Galstian et al. |
| 2012/0140133 A1 | 6/2012 | Choi et al. |
| 2012/0200908 A1 | 8/2012 | Bergh et al. |
| 2013/0048353 A1* | 2/2013 | Lin ..................... G06F 3/045 |
| | | 174/257 |
| 2016/0033845 A1* | 2/2016 | McCartney ....... G02F 1/134336 |
| | | 359/296 |
| 2017/0123204 A1* | 5/2017 | Sung .................. G02B 27/0103 |
| 2018/0059490 A1* | 3/2018 | Chen ................ G02F 1/133345 |
| 2018/0136532 A1 | 5/2018 | Paolini, Jr. et al. |
| 2018/0246327 A1* | 8/2018 | Takagi ................ G02B 27/017 |
| 2020/0409156 A1* | 12/2020 | Sissom ................ G02B 6/0023 |

\* cited by examiner

«DISPLAY SYSTEM WITH LOCALIZED OPTICAL ADJUSTMENTS»

This application claims the benefit of provisional patent application No. 62/860,721, filed Jun. 12, 2019, which is hereby incorporated by reference herein in its entirety.

BACKGROUND

This relates generally to electronic devices and, more particularly, to electronic devices with adjustable optical components.

Electronic devices sometimes include adjustable optical components. For example, wearable electronic devices such as head-mounted devices may include displays for displaying computer-generated content that is overlaid on real-world content. It may be desirable to place an adjustable optical component in line with a user's field of view. The adjustable optical component may be used, for example to adjust real-world object brightness as a user is viewing computer-generated content that is overlaid on top of real-world objects.

Challenges can arise when incorporating adjustable optical components into electronic devices. For example, adjustable optical components for head-mounted devices may be overly bulky or heavy. Some adjustable optical components have the potential to exhibit diffraction effects or other undesired effects that create visible artifacts.

SUMMARY

An electronic device such as a head-mounted device may have a display that displays computer-generated content for a user. The head-mounted device may have an optical system that directs the computer-generated image towards eye boxes for viewing by a user.

The optical system may include a spatially addressable adjustable optical component. The adjustable optical component may be configured to form a spatially addressable light modulator or adjustable lens.

The adjustable optical component may have first and second electrodes and an electrically adjustable material between the first and second electrodes. The electrically adjustable material may include a transparent conductive material such as indium tin oxide that includes a pattern of segmented trenches. The trenches may be configured to provide the transparent conductive material with electrical anisotropy, so that the sheet resistance of the transparent conductive material is different in different directions. This allows control circuitry to spatially control the voltage across the adjustable optical component.

The control circuitry may supply control signals to the adjustable optical component. Contacts may be coupled to the transparent conductive material. Control circuitry can adjust the electrically adjustable material by applying signals to the contacts during operation of the head-mounted device.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain optical components such as a display for displaying visual content and a spatially addressable adjustable optical component such as a spatially addressable light modulator (sometimes referred to as a spatially addressable adjustable tint layer) or spatially addressable liquid crystal lens (sometimes referred to as an adjustable lens or spatially addressable adjustable lens).

Adjustable optical components may have a layer of electrically adjustable material such as a liquid crystal layer sandwiched between first and second electrode layers. By applying electric fields to selected contacts along the edges of the electrode layers, a desired electric field can be created through the layer of adjustable material in a location of interest. To reduce diffraction artifacts and other undesired visual artifacts that might arise from strips of electrode material, the electrode layers may be formed from transparent conductive layers that exhibit electrical anisotropy.

In some embodiments, a head-mounted device may include a lens system that includes an adjustable lens and/or fixed component(s) such as one or more fixed lenses. An adjustable lens system may be adjusted dynamically to accommodate different users and/or different operating situations. Adjustable light modulators may be used to selectively darken parts of a user's field of view. If, as an example, a head-mounted display system is being used to display computer-generated content that overlaps real-world objects, the brightness of the real-world objects can be selectively decreased to enhance the visibility of the computer-generated content. In particular, a spatially addressable adjustable light modulator may be used to generate a dark region that overlaps a bright real-world object that is overlapped by computer-generated content in the upper right corner of a user's field of view (as an example).

Figure 1:
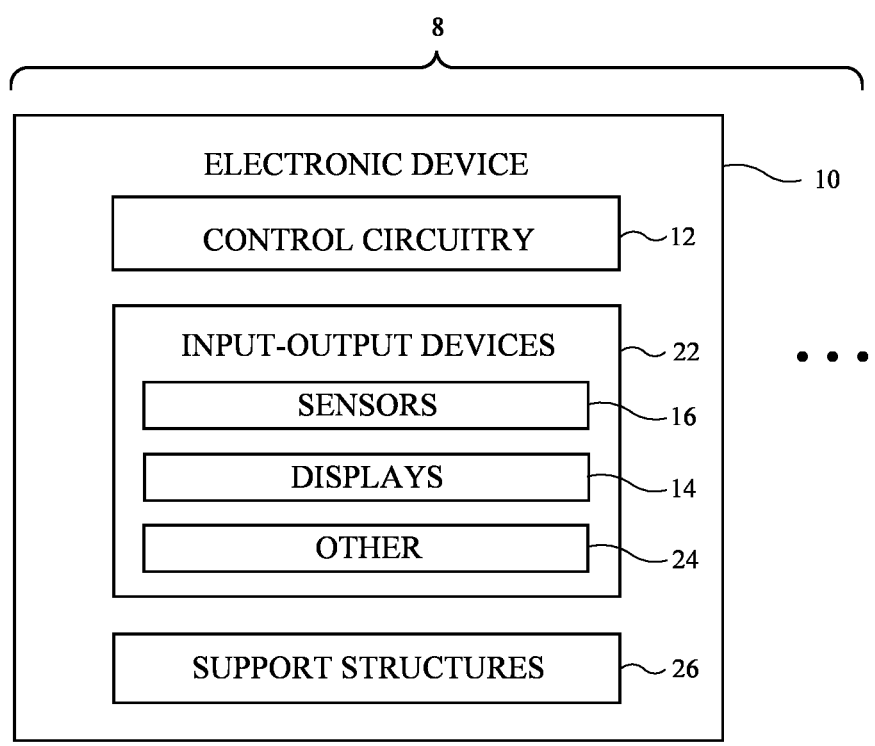
FIG. 1 is a schematic diagram of an illustrative electronic device such as a head-mounted display device in accordance with an embodiment.

A schematic diagram of an illustrative system that may include adjustable optical components is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display(s) 14. In some configurations, display 14 of device 10 includes left and right display devices (e.g., left and right components such as left and right scanning mirror display devices, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices in alignment with the user's left and right eyes, respectively. In other configurations, display 14 includes a single display panel that extends across both eyes or uses other arrangements in which content is provided with a single pixel array.

Display 14 is used to display visual content for a user of device 10. The content that is presented on display 14 may include virtual objects and other content that is provided to display 14 by control circuitry 12 and may sometimes be referred to as computer-generated content. Computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display). In other configurations, an optical coupling system may be used to allow computer-generated content to be optically overlaid on top of a real-world image. As an example, device 10 may have a see-through display system that provides a computer-generated image to a user through a beam splitter, prism, holographic coupler, or other optical coupler while allowing the user to view real-world objects through the optical coupler.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Devices 24 may include one or more adjustable optical components such as spatially addressable adjustable optical components formed from electrode layers with transparent conductive material exhibiting electrical anisotropy. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
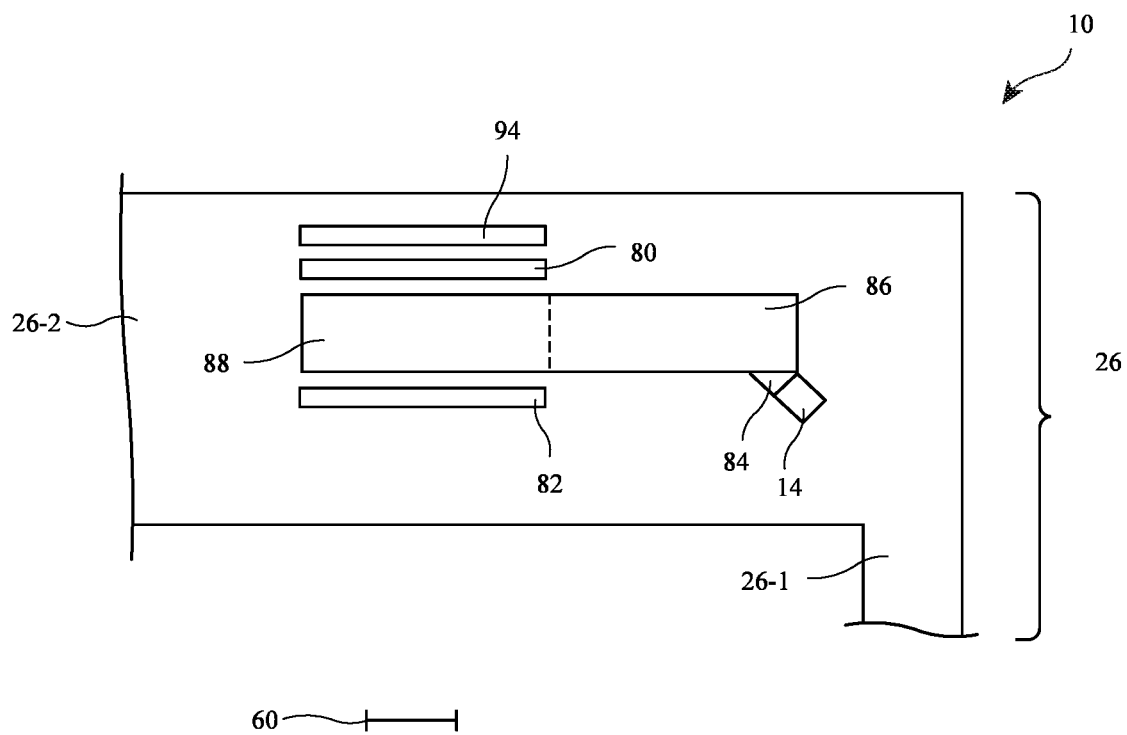
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for a main unit (e.g., support structures 26-2) and additional structures such as straps, temples, or other supplemental support structures (e.g., support structures 26-1) that help to hold the main unit and the components in the main unit on a user's face so that the user's eyes are located within eye boxes 60.

Display 14 may include left and right display portions (e.g., sometimes referred to as left and right displays, left and right display devices, left and right display components, or left and right pixel arrays). An optical system for device 10 may be formed from couplers 84 (sometimes referred to as input couplers), waveguides 86, optical couplers such as output couplers 88, lenses 80 and/or 82, and adjustable optical component(s) 94. Adjustable optical components 94 of FIG. 2 are shown as being interposed between the front face of device 10 and lenses 80. In general, adjustable optical components 94 may be located at any suitable location in device 10 (e.g., any location among components such as lenses 80 output couplers 88, and lenses 82). A user with eyes located in eye boxes 60 may view real-world objects through adjustable optical components 94 and other components of the optical system while viewing overlaid computer-generated content from display 14. Adjustable optical components 94 may include adjustable light modulators and/or adjustable lenses.

As shown in FIG. 2, the left portion of display 14 may be used to create an image for a left-hand eye box 60 (e.g., a location where a left-hand image is viewed by a user's left eye). The right portion of display 14 may be used to create an image for a right-hand eye box 60 (e.g., a location where a right-hand image is viewed by a user's right eye). In the configuration of FIG. 2, the left and right portions of display 14 may be formed by respective left and right display devices (e.g., digital mirror devices, liquid-crystal-on-silicon devices, scanning microelectromechanical systems mirror devices, other reflective display devices, or other displays). In arrangements in which display 14 is opaque and blocks real-world images from direct viewing by the user, display 14 may be an organic light-emitting diode display, a liquid crystal display, or other display and the optical coupler formed from waveguides 86 and output couplers 88 may be omitted.

In the see-through display arrangement of FIG. 2, optical couplers 84 (e.g., prisms, holograms, etc.) may be used to couple respective left and right images from the left and right display portions into respective left and right waveguides 86. The images may be guided within waveguides 86 in accordance with the principal of total internal reflection. In this way, the left and right images may be transported from the left and right sides of device 10 towards locations in the center of device 10 that are aligned with left and right eye boxes 60. Waveguides 86 may be provided with respective left and right output couplers 88 such as holograms formed on or in the material of waveguides 86. The left and right output couplers 88 may respectively couple the left and right images from the left and right waveguides 86 towards the left and right eye boxes 60 for viewing by the user.

In an illustrative arrangement, adjustable optical component 94 is a spatially addressable adjustable light modulator formed using a material with an electrically adjustable light transmission such as guest-host liquid crystal material. This material may be characterized by visible light transmission Tvis that varies as a function of applied voltage V (e.g., alternating-current peak-to-peak voltage), as shown by curve 95 of FIG. 3. When the amount of voltage across a layer of this material is less than threshold voltage VT, transmission Tvis will be relatively high and when the amount of applied voltage is more than the threshold voltage VT, transmission Tvis will be relatively low.

Figure 4:
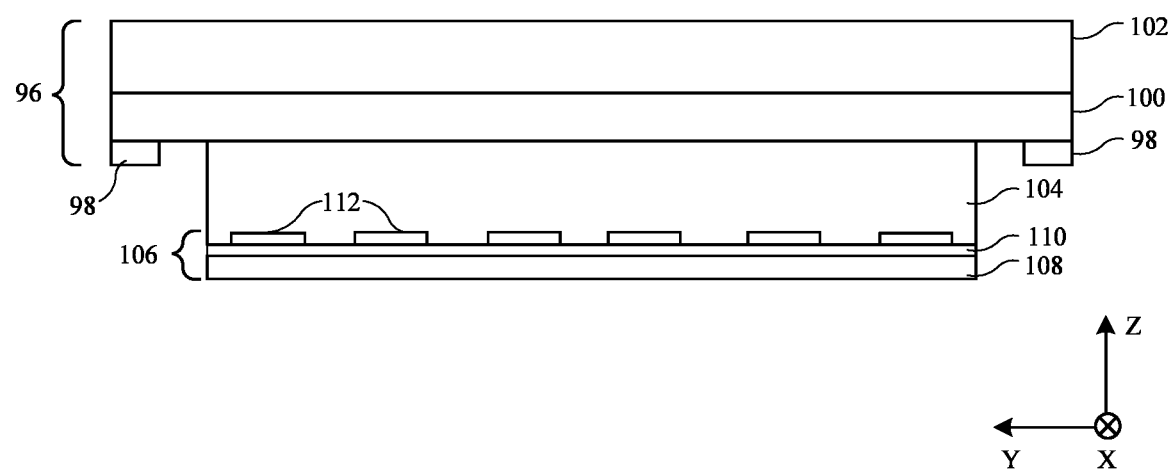
FIG. 4 is a cross-sectional side view of an illustrative spatially addressable adjustable optical component in accordance with an embodiment.

FIG. 4 is a cross-sectional side view of component 94. As shown in the illustrative configuration of FIG. 4, component 94 may have a first electrode layer (first electrode) 96 and a second electrode layer (second electrode) 106. Electrically adjustable optical material 104 may be interposed between layers 96 and 106. Layer 96 may have transparent substrate 102, transparent conductive layer 100, and a series of contacts 98 along the periphery of component 94. Contacts 98 are segmented and run along the left and right edges of conductive layer 100 parallel to the X-axis and make electrical connections to different portions of layer 100. Layer 106 may have transparent substrate 108, transparent conductive layer 110, and contacts 112. Contacts 112 are segmented and run along the front edge (out of the page edge) and rear edge (into the page edge) of layer 110 parallel to the Y-axis and make electrical connections to different portions of layer 110.

Transparent substrate layers 102 and 108 may be formed from glass, clear polymer, or other transparent material. Transparent conductive layers 100 and 110 may be formed from indium tin oxide, silver nanowires, carbon nanotubes, and/or other transparent conductive material. Layers 100 and 110 may be configured to exhibit electrical anisotropy. In particular, layer 100 may be configured to exhibit a conductivity C100Y in the Y direction that is greater than its conductivity C100X in the X direction and therefore to exhibit a sheet resistance in the Y direction that is less than its sheet resistance in the X direction. The values of the sheet resistance are finite (e.g., there are electrical paths in both the X and Y directions when signals are applied along the sides of component 94). The ratio of C100Y/C100X may be at least 2, at least 5, at least 7, at least 10, less than 100, or other suitable value. Layer 110 may be configured to exhibit a conductivity C110X in the X direction that is greater than its conductivity C110Y in the Y direction and therefore to exhibit a sheet resistance in the X direction that is less than its sheet resistance in the Y direction. The ratio of C110X/C110Y may be at least 2, at least 5, at least 7, at least 10, less than 100, or other suitable value. The X and Y directions of FIG. 4 are orthogonal. If desired, electrically anisotropic materials can have sheet resistances that are maximized and minimized along respective first and second directions that are different but not perpendicular to each other.

Figure 7:
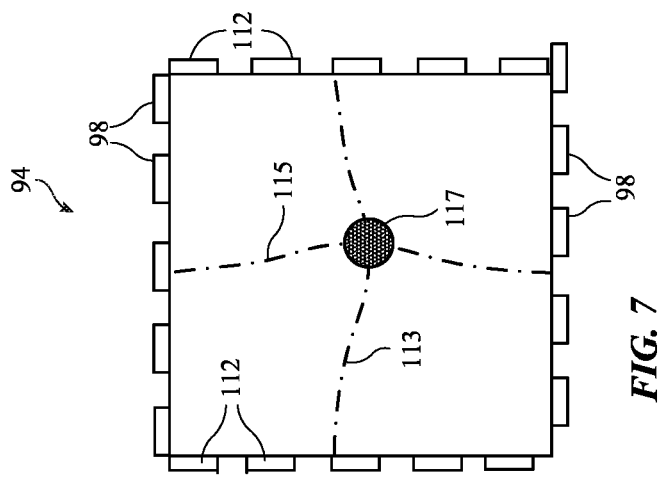
FIG. 7 is a top view of an illustrative spatially addressable adjustable optical component in accordance with an embodiment.
Figure 7:
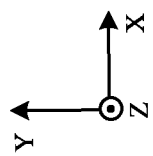
Figure 6:
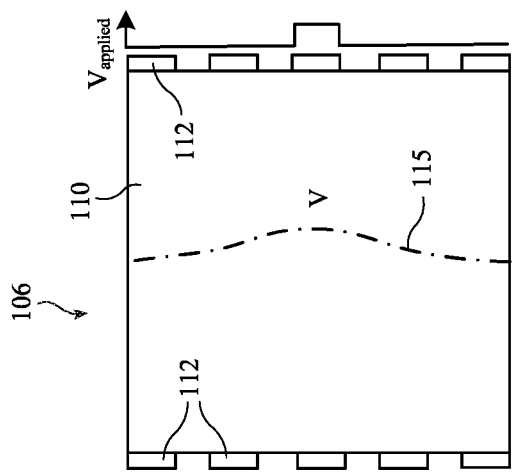
FIG. 6 is a top view of another illustrative electrode layer in a spatially addressable adjustable optical component in accordance with an embodiment.
Figure 6:
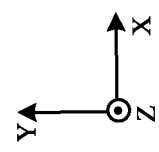
Figure 5:
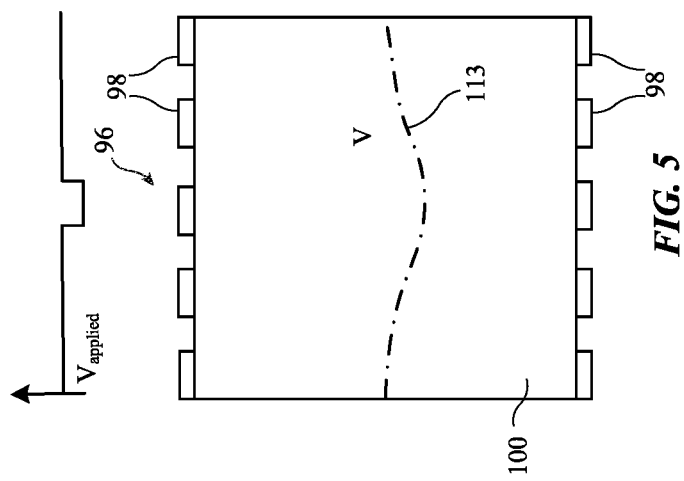
FIG. 5 is a top view of an illustrative electrode layer in a spatially addressable adjustable optical component in accordance with an embodiment.
Figure 5:
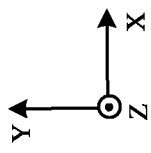

FIG. 5 is a top view of electrode 96. As shown in FIG. 5, a spatially varying voltage Vapplied may be applied across different contacts 98 on the edges of layer 110. In the FIG. 5 example, a reduced value of Vapplied is applied to the middle of 5 pairs of contacts 98. The high conductivity (and low sheet resistance) of layer 100 in the Y direction relative to the X direction causes this reduced voltage to extend along the Y dimension without spreading significantly in the X direction (due to the larger voltage drops experienced in the X direction due to the relatively high sheet resistance of layer 100 in the X direction). As a result, voltage V in layer 100 exhibits a dip as shown by line 113 in the middle of layer 110. FIG. 6 is a top view of electrode 106. As shown in FIG. 6, electrodes 112 may be used to supply a desired localized voltage chain along a section of layer 110 that extends parallel to the X axis. In particular, Vapplied may be locally higher in the middle of 5 pairs of contacts 112 that extend along the Y axis. The high conductivity (and low sheet resistance) of layer 110 in the X dimension relative to the Y direction causes the localized increase in Vapplied to spread along the X dimension without spreading significantly in the perpendicular Y direction, so that voltage V in layer 110 exhibits a rise in the middle of layer 110 as shown by line 115 of FIG. 6. The localized rise in the voltage in layer 110 along the Y direction combined with the localized decrease in the voltage in layer 100 along the X direction creates a localized area such as region 117 of FIG. 7 in which the difference between the voltage in layer 110 and the voltage in layer 100 is decreased relative to the rest of the layer. In this example, the localized change results in a voltage difference (and electric field difference across layer 104) that is less than the rest of layer 104. If desired, the localized change may result in a voltage difference (and electric field difference across layer 104 in the Z dimension) that is locally greater (e.g., maximized) relative to the rest of layer 104.

During operation, control circuitry 12 may adjust the voltages Vapplied applied to the contacts of component 94. By adjusting the locations of the changes in voltage Vapplied in this way (e.g., by supplying appropriate voltages to various sets of contacts 98 and contacts 112), the location of locally adjusted voltage region (in which the electric field through electrically adjustable optical material layer 104 is adjusted up or down relative to the rest of layer 104) can be varied as desired (e.g., to place a localized low transmission region in a desired location relative to clear portions of layer 104), to adjust the power of a lens and/or the location in the X-Y plane of the lens, etc.

Figure 3:
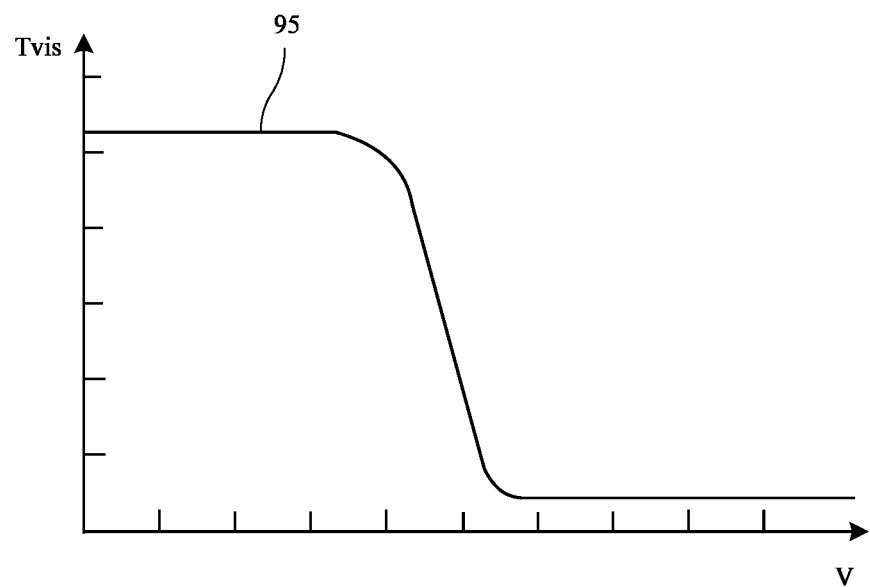
FIG. 3 is a graph of visible light transmission versus applied drive signal for a light modulator such as a light modulator based on a guest-host liquid crystal device in accordance with an embodiment.

When it is desired to create a localized change in light transmission, layer 104 may be formed from a material such as a guest-host liquid crystal material that exhibits a change in light transmission versus applied voltage of the type shown in FIG. 3. When it is desired to create a controllable localized change in the phase of the light passing through layer 104 (e.g., to create a dynamically adjustable lens), layer 104 may be formed from a liquid crystal material. A liquid crystal layer may alter the phase of light rays traveling through the liquid crystal layer in proportion to the magnitude of the applied electric field across the layer (parallel to the Z dimension). When layer 104 is a liquid crystal layer, a lens may be formed in an area such as area 117 or other selected area and this area (and its strength) can be adjusted by applying various voltages Vapplied to the contacts of component 94.

With an illustrative configuration, layer 100 is formed from a blanket conductive film such as a thin-film coating layer of indium tin oxide, carbon nanotubes, silver nanowires, or other transparent conductive material. The thickness of the film may be 0.1-0.5 microns, at least 0.01 microns, at least 0.05 microns, at least 0.1 microns, at least 0.4 microns, less than 100 microns, less than 10 microns, less than 1 micron, or other suitable thickness. The blanket film may or may not exhibit electrical anisotropy in its unpatterned state. To create and/or enhance the electrical anisotropy of layer 100, layer 100 may be patterned by providing layer 100 with openings. The openings represent portions of the layer without electrically conductive material and therefore affect the sheet resistance of the layer. By patterning the openings in an appropriate pattern, anisotropy in the sheet resistance of the layer may be achieved. By ensuring that the openings are sufficiently small, the visibility of the openings to the user may be reduced or eliminated.

Figure 8:
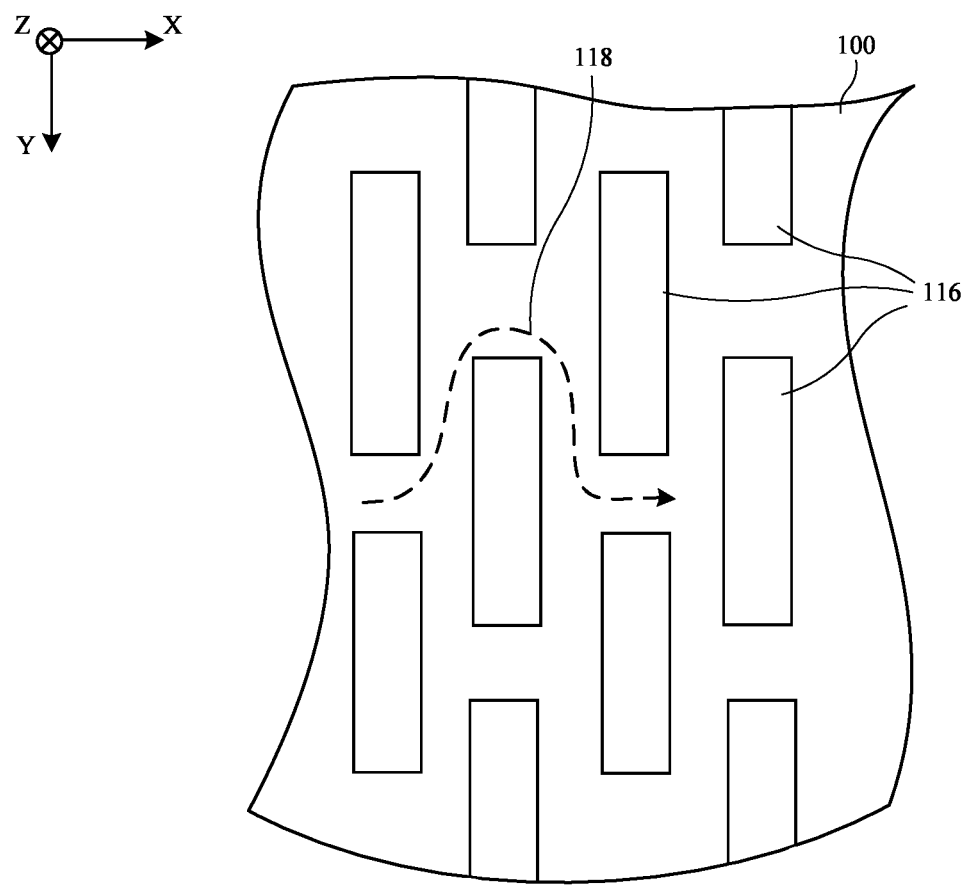
FIG. 8 is a top view of an illustrative layer with electrical anisotropy in accordance with an embodiment.

The openings may, for example, be elongated segmented trenches such as trenches 116 of FIG. 8. Trenches 116 may extend in segmented and staggered lines that form columns extending along the Y dimension (as shown in FIG. 8) and/or segmented and staggered lines that form rows extending along the X dimension. In trenches 116, no conductive material is present, so conductivity is low (e.g., zero) and resistivity is high (e.g., infinite). Current flowing along the Y direction (in the FIG. 8 example), can travel directly along the paths between respective columns such as path 119. Current flowing generally along the X direction (in the FIG. 8 example) can travel only along meandering indirect paths such as path 118. Because paths 119 are shorter (per unit of Y dimension) than paths 118 are (per unit of X dimension), the conductivity of layer 100 is greater along the Y dimension (and sheet resistance is less) than the X dimension (e.g., the sheet resistance of layer 100 exhibits anisotropy because the sheet resistance of patterned layer 100 is less along the Y dimension than the X dimension).

Trenches 116 may be relatively small so as to avoid creating undesired visual artifacts. The electrical anisotropy (and the nature of visual artifacts) can be adjusted by adjusting the length of trenches 116 along the Y dimension, the width of trenches 116 along the X dimension, and the spacing between adjacent trenches 116 in the X and Y dimensions. As an example, trenches 116 may be less than 65 microns long (or less than 40 microns, less than 20 microns, or other suitable length) to ensure that trenches 116 are not visible to the user of device 10 during operation. Configurations in which trenches 116 are at least 20 microns in length, less than 500 microns in length, or other suitable lengths may also be used. The width of trenches 116 may be about 2 microns (or at least 0.5 microns, less than 10 microns, or other suitable width). The separation between trenches 116 in the X dimension may be about 8-125 microns and the separation between trenches 116 in the Y dimension may be about 2 microns, at least 0.2 microns, less than 10 microns, 1-5 microns, or other suitable size.

Figure 9:
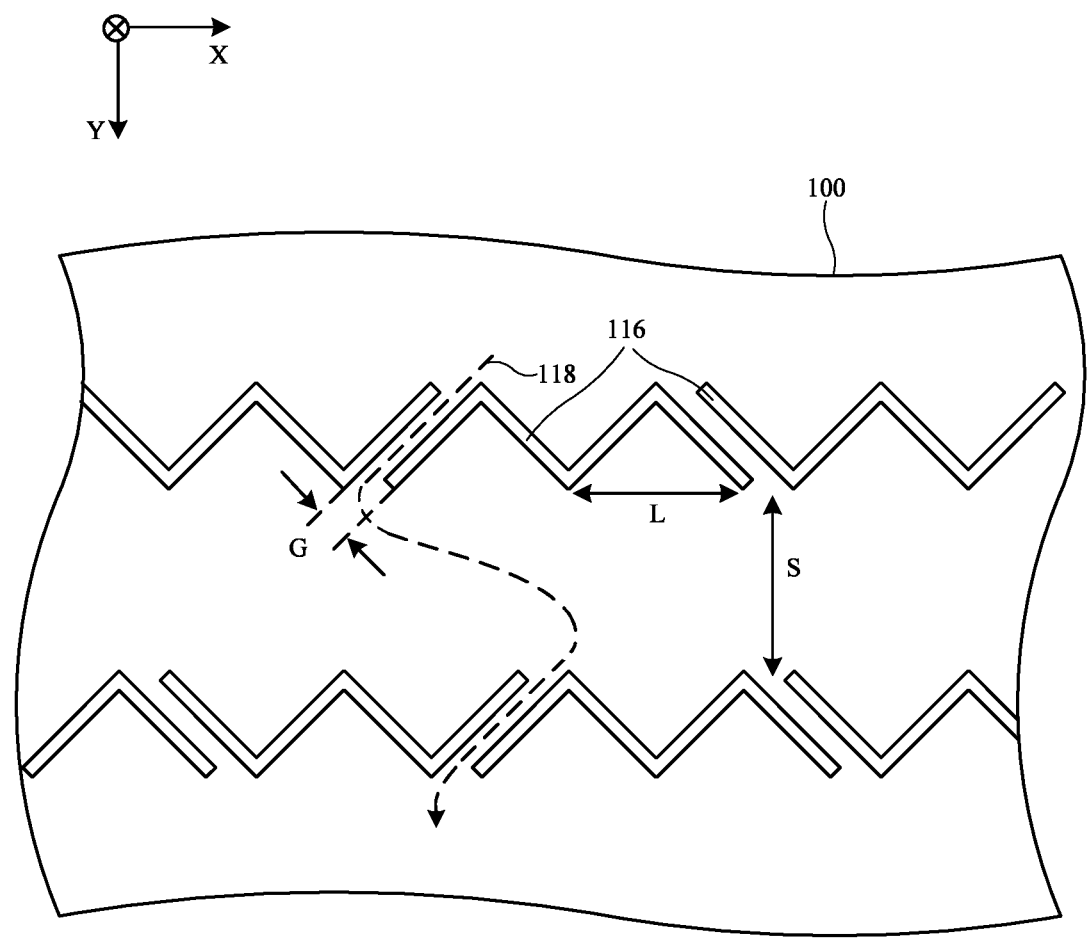
FIG. 9 is a top view of another illustrative layer with electrical anisotropy in accordance with an embodiment.

In the example of FIG. 9, W-shaped trenches 116 have been formed in layer 100, resulting in a greater sheet resistance (and lower conductivity) for layer 100 in the Y dimension than in the X dimension. The lines of W-shaped trenches of FIG. 9 may be separated from each other by a distance S of at least 5 microns, at least 20 microns, at least 25 microns, at least 65 microns at least 125 microns, less than 500 microns, less than 300 microns, or other suitable distance. The width of each trench 116 may be at least 1 microns, less than 3 microns, 2 microns, or other suitable size. The gaps G between adjacent W-shaped trenches 116 may be at least 2 microns, at least 3 microns, at least 5 microns, less than 25 microns, less than 20 microns, 10-20 microns, or other suitable distance. The half-width L of each trench 116 may be at least 20 microns, less than 500 microns, or other suitable size. The cumulative length of each W-shaped trench may be 10-500 microns, at least 50 microns, less than 400 microns, less than 1000 microns, or other suitable length. The individual portions (line segments) of each W-shaped trench may be oriented at an angle of 45°, at least 25°, less than 70°, 30-60°, or other suitable angle with respect to the X and Y directions. By arranging trenches 116 diagonally to the user's frame of reference, the ability of the user's eyes to discern the presence of trenches 116 may be reduced and undesired visual artifacts due to the presence of trenches 116 can therefore be minimized.

If desired. W-shaped trenches may have curved shapes that form undulating W-shapes, trenches 116 may have S-shapes or other sinuous shapes (e.g., other non-straight shapes), or may have any other shapes with curved and/or straight portions. S-shaped trenches and trenches with other shapes and the spacing between trenches may be chosen to help reduce light diffraction effects and/or visibility to a user. In general, trenches 116 may have any shapes and patterns that help create electrical anisotropy while spreading out diffraction to prevent constructive interference and visual artifacts.

Figure 10:
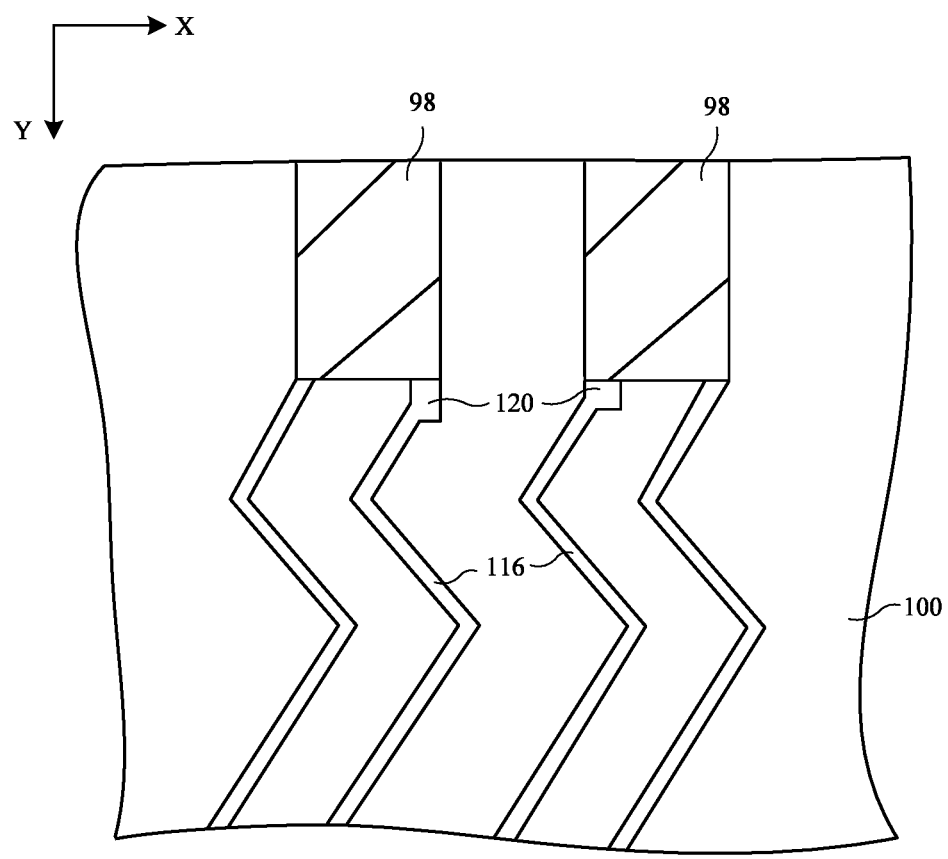
FIGS. 10 and 11 are top views of illustrative edge portions of layers in spatially addressable adjustable optical components in accordance with an embodiment.
Figure 11:
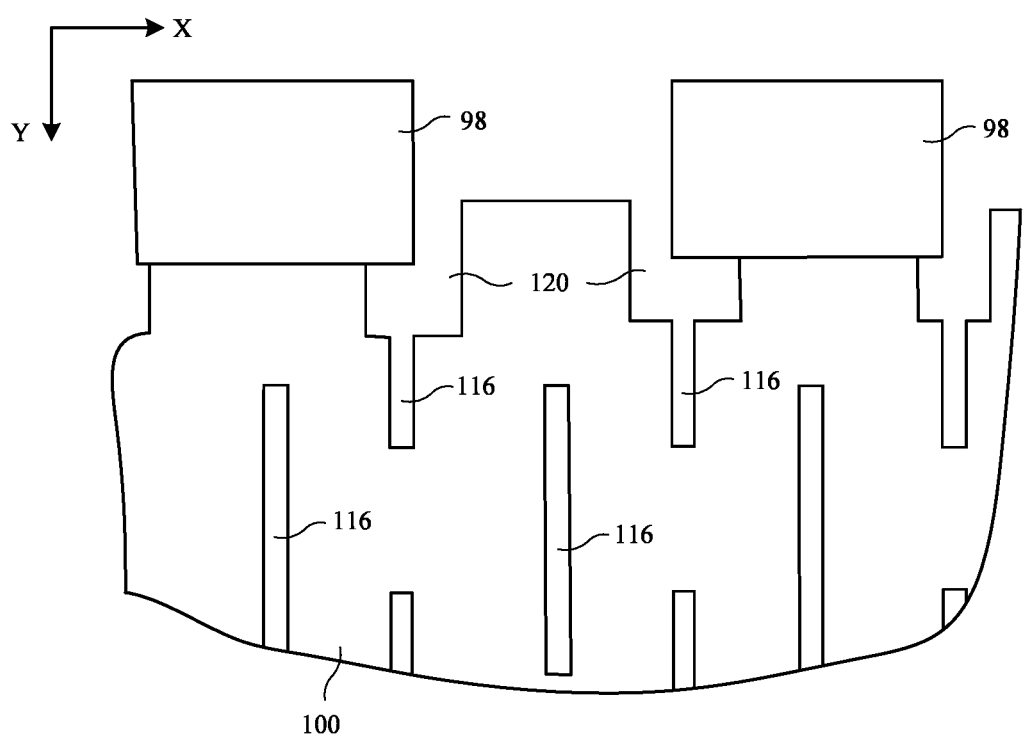

Contacts 98 may be formed from thin-film metal coating layers that are patterned (e.g., using lithography, etc.) on the blanket film forming electrode layer 100. Contacts 112 may likewise be formed from a patterned thin-film metal layer on layer 110. Along the edge of component 94, there is a potential for capacitive coupling across trenches 116 (e.g., when alternating-current drive signals Vapplied are being applied to component 94 to adjust transmission in a guest-host liquid crystal layer, etc.). This has the potential to lead to undesired parasitic power consumption. To help reduce or eliminate this power loss, trenches 116 may be provided with locally widened portions adjacent to the contacts. For example, in layer 100, trenches 116 may be locally widened to form locally widened portions 120 adjacent to contacts 98, as shown in FIGS. 10 and 11. The width of trenches 116 may, for example, be increased by a factor of at least 2, at least 5, 5-20, at least 10, less than 20, or other suitable amount along the X direction for a distance of at least 10 microns, at least 20 microns, 15-30 microns, less than 100 microns, or other suitable distance from the edges of contacts 98 along the Y direction.

System 8 may gather and use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. A spatially addressable adjustable optical component, comprising:
   a first electrode having a first sheet resistance along a first direction and a second sheet resistance that is more than the first sheet resistance along a second direction that is orthogonal to the first direction;
   a second electrode having a third sheet resistance along the first direction and a fourth sheet resistance that is less than the third sheet resistance along the second direction; and
   a layer of electrically adjustable optical material between the first and second electrodes, wherein an area of the layer of electrically adjustable optical material overlapping the first and second electrodes is configured to form a lens in response to a voltage applied across the area of the layer of electrically adjustable optical material using the first and second electrodes, and wherein a lens power of the lens is adjustable based on changes in the applied voltage to additional voltages.

2. The spatially addressable adjustable optical component defined in claim 1 wherein the layer of electrically adjustable optical material comprises transparent liquid crystal material configured to exhibit changes in phase in light rays passing through the transparent liquid crystal material in response to changes in voltage across the layer of electrically adjustable optical material that are applied using the first and second electrodes.

3. The spatially addressable adjustable optical component defined in claim 1 further comprising:
   a first set of contacts coupled to first and second opposing sides of the first electrode, wherein the first and second opposing sides are spaced apart along the first direction; and
   a second set of contacts coupled to third and fourth opposing sides of the second electrode, wherein the third and fourth opposing sides are spaced apart along the second direction.

4. The spatially addressable adjustable optical component defined in claim 1 wherein the first electrode comprises a transparent substrate coated with a transparent conductive coating that has segmented trenches running along the first direction.

5. The spatially addressable adjustable optical component defined in claim 1 wherein the first electrode comprises a transparent substrate coated with a transparent conductive coating that has trenches with elongated portions oriented at an angle of 30-60° with respect to the first direction.

6. The spatially addressable adjustable optical component defined in claim 5 wherein the trenches include trenches that are not straight.

7. A system, comprising:
   a head-mounted support structure;
   a display device coupled to the head-mounted support structure that is configured to provide an image containing computer-generated content; and
   an optical system that includes an optical coupler and an adjustable optical component and that provides the image using the optical coupler to an eye box while allowing a real-world object to be viewed through the adjustable optical component from the eye box, wherein the optical coupler is disposed between the adjustable optical component and the eye box, and wherein the adjustable optical component comprises:
   a first electrode formed from a first transparent conductive layer on a first transparent substrate, wherein the first transparent conductive layer contains openings patterned to provide the first transparent conductive layer with a first sheet resistance along a first direction and a second sheet resistance that is more than the first sheet resistance along a second direction that is different than the first direction;
   a second electrode formed from a second transparent conductive layer on a second transparent substrate, wherein the second transparent conductive layer contains openings patterned to provide the second transparent conductive layer with a third sheet resistance along the first direction and a fourth sheet resistance that is less than the third sheet resistance along the second direction; and a layer of electrically adjustable optical material between the first and second electrodes.

8. The system defined in claim 7 wherein the first direction is perpendicular to the second direction and wherein the openings of the first and second transparent conductive layers comprise trenches having lengths less than 500 microns.

9. The system defined in claim 8 wherein the trenches have widths of 0.5 microns to 20 microns.

10. The system defined in claim 9 wherein the first and second transparent conductive layers comprise indium tin oxide.

11. The system defined in claim 9 wherein the layer of electrically adjustable optical material comprises liquid crystal material, wherein the first electrode comprises a first set of metal contacts coupled to the first transparent conductive layer and the second electrode comprises a second set of metal contacts coupled to the second transparent conductive layer, and wherein the trenches have locally widened portions adjacent to the contacts.

\* \* \* \* \*